Nov. 2, 1943.      C. E. MOBERG      2,333,192
WELDER'S TRAINING DEVICE
Filed Oct. 29, 1942
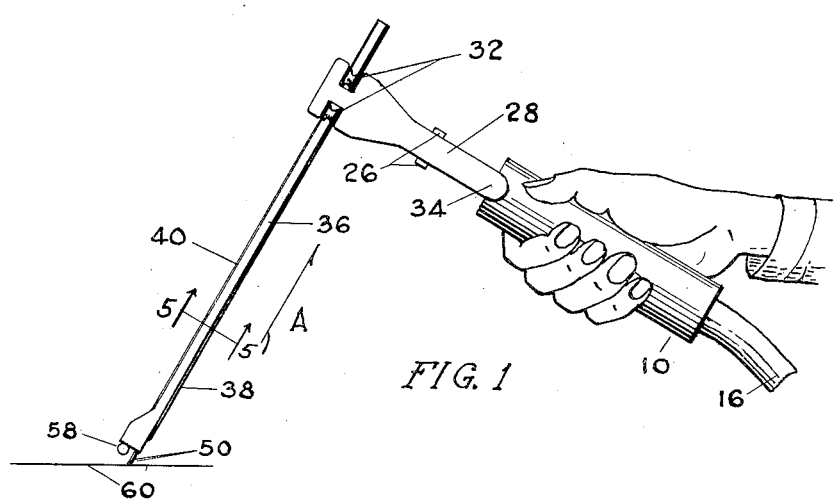
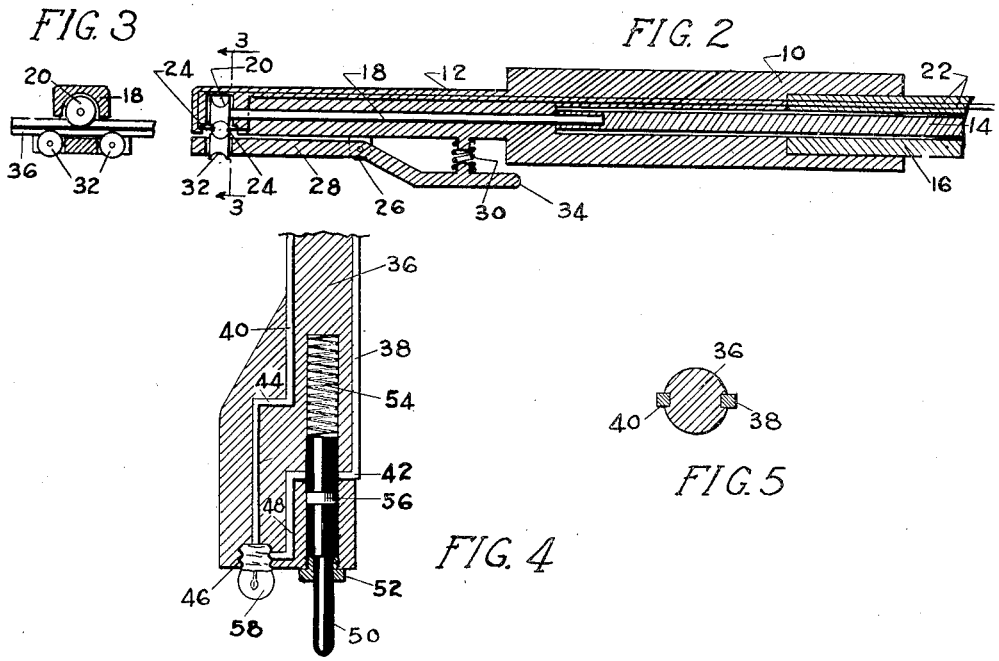
CARL E. MOBERG
INVENTOR
BY Charles R. Fay
ATTORNEY under_stood# UNITED STATES PATENT OFFICE 2,333,192

WELDER'S TRAINING DEVICE

Carl E. Moberg, Worcester, Mass.

Application October 29, 1942, Serial No. 463,790

14 Claims. (Cl. 35—1)

This invention relates to devices for teaching and training students in the art of welding, and specifically the invention comprises a device simulating a welding rod holder and having a simulated welding rod, together with means for moving the rod in a direction away from the work at the rate of speed of melting of an actual welding rod, so as to allow the student to practice holding and moving the welding rod along a proposed welding line in exact accordance with actual practice, but without wasting welding rod metal, and tying up expensive machinery.

Objects of the invention include the provision of means for training welders without using welding rod metal; the provision of an imitation welding rod holder of the dimensions and weight of an actual holder and embodying means simulating a welding rod which is movable to imitate the lessening of the rod length as it melts, so that the student brings the rod holding hand closer and closer to the work in exactly the same manner as in actual welding; and the provision of an automatically retracting dummy welding rod which includes controls to stop the retraction of the rod when the student fails to maintain the proper arc length, and including a visual signal also, to immediately apprise the student when he holds the rod at any position other than that which is correct.

Other objects and advantages of the invention will appear hereinafter.

Reference is to be had to the accompanying drawing in which

Fig. 1 is a view illustrating the manner of use of my welder's training device;

Fig. 2 is an enlarged view in longitudinal section through the holder;

Fig. 3 is a section on line 3—3 of Fig. 2;

Fig. 4 is an enlarged longitudinal section through the lower end of the rod; and Fig. 5 is an enlarged section on line 5—5 of Fig. 1.

The welding rod in a welding apparatus is electrically heated and fused by means of conductors mounted in a holder for the rod and the latter is clamped to the holder. Obviously the melting of the rod gradually shortens its length and one of the hardest operations in welding is to bring the welding rod holder down gradually toward the work evenly and to maintain the arc length while doing so. This can be learned only by practice, and thus much welding rod has been wasted, and welding apparatuses are made useless to actual production during the training period. The drawing illustrates a single form of the invention and it is to be noted that many variations in structure are possible without departing from the scope of the appended claims.

The manner of holding a welding rod to a surface to be welded, or simulation of such rod, is shown in Fig. 1, and I have simulated the usual welding rod and holder in shape, size, and weight so that the training device and the real welding rod holder will feel and handle the same. A casing 10 forming a hand grip is provided, this casing having an elongated projection 12 extending forwardly of the hand grip. As shown, casing 10 receives a flexible shaft 14 encased in a sheath 16, this shaft approximating the weight of the welding cable. Some convenient means not shown is desirable for varying the speed of rotation of the shaft, as for instance in place of flexible shaft 14, a small motor, either fixed or variable speed, could be mounted in the casing if desired.

In any event, shaft 14 couples to a shaft 18 journaled in the extension 12 and thereby shaft 18 is rotated by shaft 14 for a purpose to be described. Shaft 18 is fixed to a drive means, such as a friction roller 20 as shown, or other convenient means. Roller 20 is located adjacent the free end of extension 12 and fits in an open slot therein. A pair of electrical conductors 22 lead up through sheath 16 and the casing and an end of each conductor is disposed at either side of roller 20 in advance thereof relative to the roller slot as shown in Fig. 2 at 24.

A pair of ears 26 on extension 12 pivotally mount a clamp lever 28 which extends beyond roller 20. A spring 30 normally urges the lever in a clockwise direction in Fig. 2 towards the roller. This lever is an approximation of the usual welding rod clamp and is operable in the same manner. I provide a pair of idler rollers 32 at the free end of the lever, it being noted that all three rollers are grooved to provide a rounded passage therebetween in a direction normal to the casing 10. The lever at 34 provides a thumb piece to retract rollers 32 from roller 20 to selectively release a round rod or the like, but when the spring 30 is operative to move rollers 32 toward roller 20, the rod will be gripped therebetween.

Rod 36 comprises a non-conducting element to be gripped by the rollers, and this rod is provided with longitudinal diametrically opposed conductors 38, 40 set thereinto for sliding cooperation with contacts 24 to make contact at all times from wires 22 down to the end of the rod, see Fig. 4. Conductor 38 is turned into the rod as at 42 and conductor 40 is turned from the rod as at 44. The conductor at 44 leads to a lamp socket 46, and another conductor 48 leads from the other side of the lamp socket towards the end 42 of conductor 38.

The lower end of rod 36 is provided with a longitudinal bore housing a non-conducting plunger-type stylus 50 which is prevented from exit by a hollow nut 52. A spring 54 normally urges the stylus towards its outwardmost extent, as illustrated in Fig. 4, but yields to allow the stylus to be retracted within the bore. A ring-type contact 56 surrounds the stylus and will bridge contacts 42, 48 to light lamp 58 when the ring touches the opposed rod conductors, as the stylus is retracted as against a weld surface 60.

Wires 22 connect and control the motor for shaft 14 whether this motor is stationary or portable or carried in the casing 10, and it will be clear that not only is the lamp lit, but the shaft rotates, when the ring contact 56 bridges the conductors 42, 48 and only under this condition. The stylus may be pushed back in its bore too far so that the ring contact passes the contacts 42, 48, or the stylus may extend out too far for closing the circuit, as shown in Fig. 4.

In the operation of the device, the rod 36 is moved to the position shown in Fig. 1 relative to the holder, by pressing on thumb piece 34 and manually sliding the rod to the desired position. The student then grasps the casing hand grip as shown, exactly as though the device were an actual welding rod holder, and applies the device to the work as at 60, allowing the weight of the device to depress the stylus retracting it into its bore. At the instant the lamp lights, the motor starts, and roller 20 is rotated in a direction to slowly draw the rod 36 in the direction of arrow A in Fig. 1, so that it retreats or is retracted from the work at the rate of speed of melting of the actual rod. This renders it necessary for the student to lower his hand as he passes along the theoretical line of weld in order to keep the lamp lit and the rod moving, and this double hand motion coordination, which is absolutely necessary to good welding, is soon learned without using welding rod or tieing up welding apparatus.

The student cannot lean on the device so that it rides on the stylus as a support because the motor will stop and the lamp go out due to a too great retraction of the stylus under these circumstances, and the correct arc length necessary for welding is indicated by the extent of protrusion of the stylus when its ring contact 56 bridges the contacts 42, 48.

It will be seen from the above that I have provided a welder's training device carrying out the objects of the invention, and that actual welding conditions are simulated exactly so that the student can easily learn by practicing without waste and without rendering welding apparatus useless for necessary production.

The extension 12 may be swiveled to obtain different rod-holding angles, and by having a variable speed motor or clutch different retracting speeds of the rod according to different rates of melting are obtainable. The present device has many parts the same as a real rod holder, and even shaft 14 is similar in weight to the welding cable of a welding rod holder.

Having thus described my invention and the advantages thereof, I do not wish to be limited to the details herein disclosed, otherwise than as set forth in the claims, but what I claim is:

1. In a device of the class described, a support, a non-fusible rod or the like in simulation of a welding rod movably mounted on the support, and means effective to move said rod away from support at a rate of speed substantially approximating the speed of melt of a welding rod.

2. In a welder's training device, a support, a non-fusible rod movably mounted on the support, said rod having an end for contact with a surface, and electric means effective to retract said rod relatively from the surface so that said support relatively approaches the surface when said contact is maintained.

3. A device as recited in claim 2 including a movable element at said one end of the rod, means yieldably extending the element and means controlled by the relative position of the element and rod to operate said rod retracting means upon retraction of the element relative to the rod.

4. A welder's training device comprising a casing forming a hand grip, a rod-holding means on the casing, a non-fusible rod held in said means, and means for axially traveling the rod in simulation of the shortening of a welding rod by melting.

5. A device as recited in claim 4 including switch means in the rod to selectively start and stop said rod traveling means.

6. A device as recited in claim 4 including a movable element in said rod, said element being adapted to be moved relative to the rod by contact with a surface, said movable element being effective to start and stop said rod traveling means depending on the relative positions of the element and rod.

7. A welder's training device comprising a non-fusible simulated welding rod and a support therefor, means to travel the rod relative to the support, a control device for said means comprising a movable and a relatively fixed element, said movable element normally extending from the rod and retractable into the latter to contact the fixed element.

8. A device as recited in claim 7 wherein said movable element is embodied in a stylus movably mounted on the rod, the position of the stylus relative to the fixed element being under control of the student.

9. A welder's training device comprising a simulated welding rod and a manually manipulated support therefor, means to move the rod relative to the support comparatively to the speed of melting of an actual welding rod, a movable stylus at one end of the rod for engaging a surface over which the rod is to be moved in simulation of the welding action, and indicating means indicative of the correct length of welding arc, said stylus controlling the operation of the indicating means.

10. A device as recited in claim 9 wherein said indicating means comprises a start and stop control for the rod moving means.

11. A device as recited in claim 9 wherein said indicating means comprises a visual device.

12. A device as recited in claim 9 wherein said indicating means comprises a start and stop control for the rod moving means, a lamp, and lamp control means.

13. A welder's training device comprising a manually manipulatable casing, a rod holder thereon, a cable leading into the casing, a rod in the holder, electrical conductors on the rod, contacts on the holder for electrical connections to the conductors, a switch on the rod, said switch comprising a movable stylus, a contact thereon, and a fixed contact on the rod for each conductor, and electric power means to move the rod relative to the holder, said cable being connected to said electric power means.

14. A device as recited in claim 13 including a lamp in the circuit.

CARL E. MOBERG.